United States Patent [19]

Stelleman et al.

[11] 4,312,296

[45] Jan. 26, 1982

[54] SEA CAGE FOR FARMING FISH

[76] Inventors: Yan Stelleman, rue de la Madeleine, 22210 Plemet; Gerard Jouan, Domaine de Beauregard, 56480 Cleguerec, both of France

[21] Appl. No.: 108,814

[22] Filed: Dec. 31, 1979

[51] Int. Cl.³ .............................................. A01K 63/00
[52] U.S. Cl. ...................................................... 119/3
[58] Field of Search .................................. 119/3, 4, 2

[56] References Cited

U.S. PATENT DOCUMENTS

| | | | |
|---|---|---|---|
| 4,084,543 | 4/1978 | Pequegnat | 119/3 |
| 4,147,130 | 4/1979 | Goguel | 119/3 |

FOREIGN PATENT DOCUMENTS

| | | | |
|---|---|---|---|
| 2420920 | 11/1979 | France | 119/3 |
| 2008912 | 6/1979 | United Kingdom | 119/3 |

*Primary Examiner*—Hugh R. Chamblee
*Attorney, Agent, or Firm*—Alter and Weiss

[57] ABSTRACT

A marine cage for breeding fish comprises axle means around which the cage is adapted to be revolved. The cage has a grating grill mesh or the like for preventing escape of the fish. At the ends of said axle means are fixed two floats for monitoring the ballasting, when one is full of water, the cage being then completely immersed and said axle means being horizontal and when the said float is empty of water, the cage then being semi-immersed and being capable of turning around said axle means. Inside the cage is fixed a means defining a rudder when the cage is immersed and said axle means is horizontal, which means serves as collection device when the cage is caused to turn slowly around the said axle means when horizontal.

7 Claims, 14 Drawing Figures

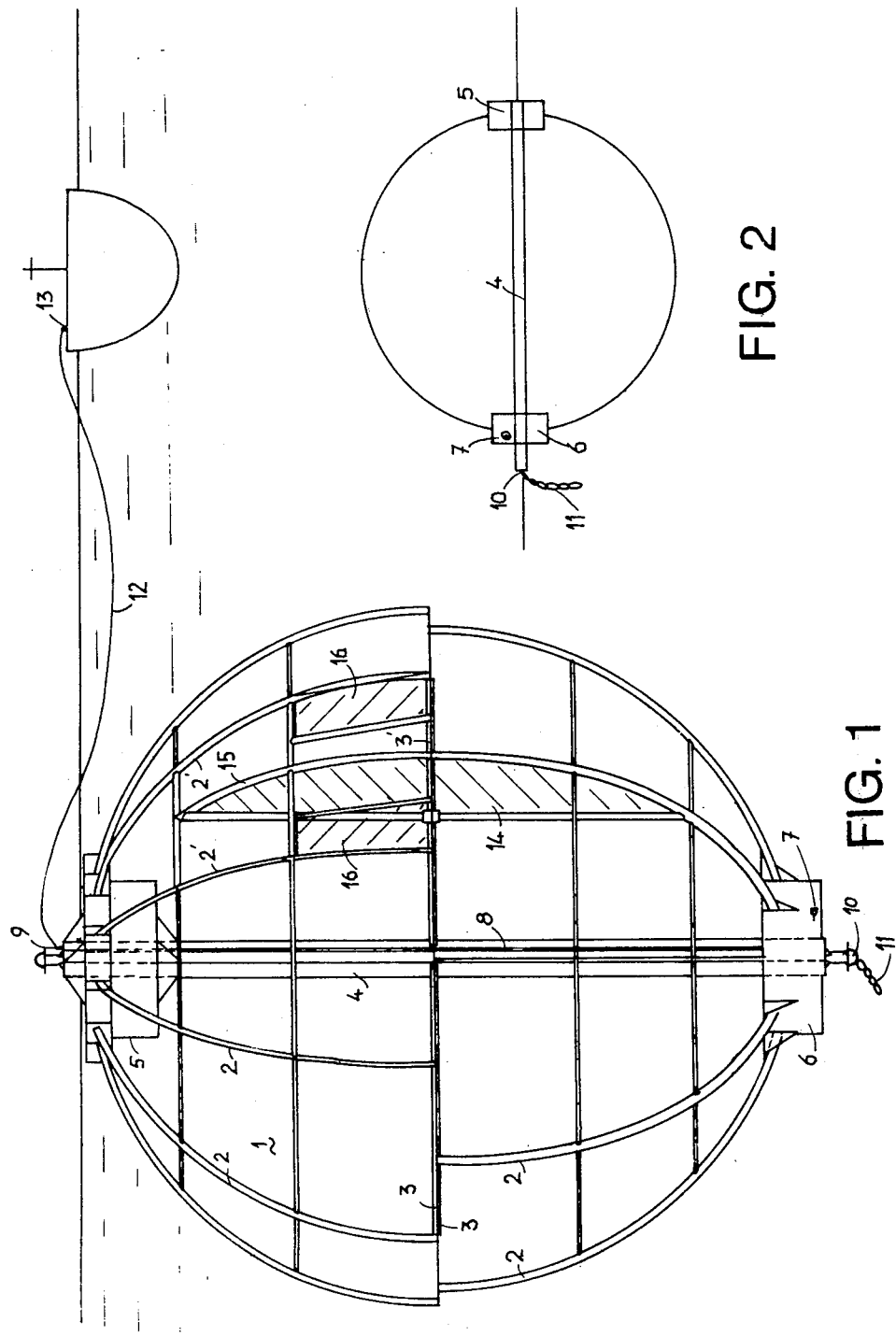

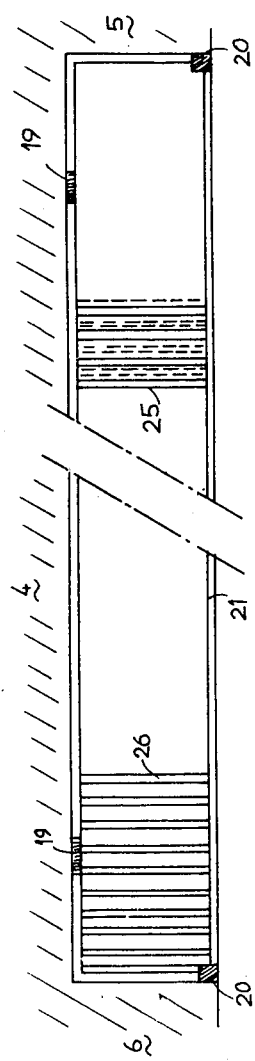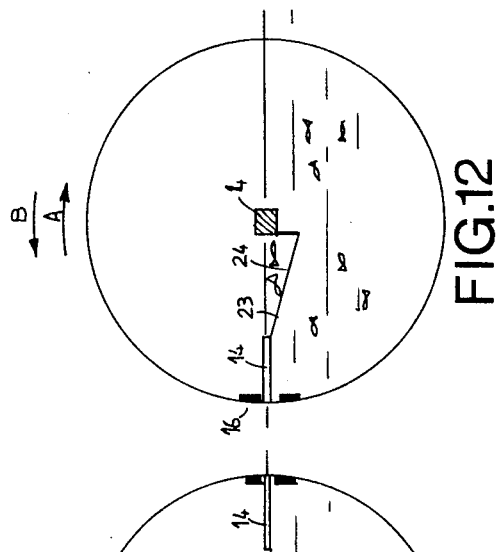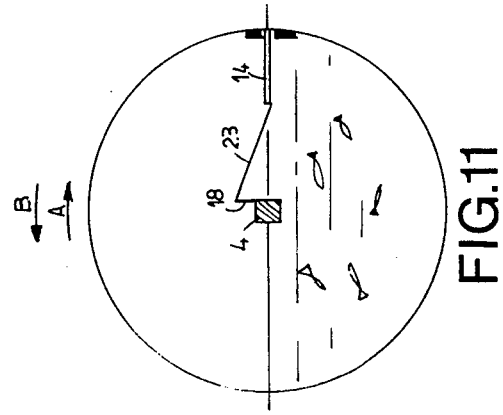

SEA CAGE FOR FARMING FISH

The present invention concerns a marine cage intended for the breeding of fish in the sea.

To illustrate the state of the technology, as regards marine cages, the cage described in French Patent Application entitled "Improvements in means for marine aquacultures" filed on the Feb. 6th 1978 under the national registration number 7803178 by MM. Antonious Streichenberger and Yan Stellman the latter being the applicant first mentioned in the present application is mentioned in particular.

Objects of the present invention, at least in its preferred form, are as follows:
to provide a marine cage which is provided with means facilitating its manipulation;
to provide a marine cage provided with means permitting of the sorting of the fish; and
to provide a marine cage provided with means facilitating the feeding of fish in the cage.

According to the present invention there is provided a marine cage for breeding fish comprising an axle means around which is arranged a cage structure provided with a grating mesh or grill for preventing escape of the fish, means defining at the ends of the said axle means two floats one of which at least serves as a ballast device in that it can be filled with liquid so that the axle means will be practically vertical when the float is full of liquid, the cage then being substantially completely immersed and said axle means being horizontal when the float is empty of liquid, the cage then being partly immersed and being capable of being rotated around the said axle means.

According to a preferred feature of the invention, the cage includes a plate inside the cage structure and lying in a plane containing the said axle means, so that said plate will serve to orientate the cage when the latter is immersed with said axle means vertical. The said plate preferably has a boundary edge extending to the grating so that the plate can serve, when the said cage is horizontal partly immersed condition, as a collection device for dead fish in the cage, when the cage is caused to turn around said axle means, when horizontal.

According to another preferred feature the cage has a door in the immediate proximity of the said plate, giving access to at least one of the faces of the said plate.

According to another preferred feature, inside the cage there may be a fish grading or sorting plate structure being part of a connection panel extending between said axle means and the grating, which comprises meshes or slits so that with the cage in the partly immersed condition with said axle means horizontal turning around of the cage effects separation of the fish as only fish of a certain size will be able to pass through the meshes or slits.

According to another preferred feature the said panel includes said plate, the plate structures and an intermediate plate section treated between the plate and plate structures, so that the intermediate plate section and the plate structure define for the collection of fish which cannot pass through the plate structure.

According to another preferred feature substantially perpendicularly to said axle means there is fixed on the plate a radial feed nozzle through which particles of food may be directed under pressure towards the center of the cage in a direction which is opposite to the current flow the region of the sea in which the cage is located.

The cage preferably is spherical and is made up of curved cage bars extending radially from the floats and circumferentially of said axle means.

The features of the present invention mentioned above, as well as others, will appear more clearly on reading the following description of embodiments of the invention, the said description being made in relation to the attached drawings in which:

FIG. 1 is a diagrammatic view in vertical section, of a cage according to a first embodiment of the invention in the immersed position;

FIG. 2 is a diagrammatic view in vertical section of the cage of FIG. 1 in the semi-immersed position;

FIG. 9 shows within detail the fish grading plate structures of the cage of FIGS. 7 and 8 and its fixing in relation to said axle means of the cage;

FIGS. 10 to 12 illustrate the manipulations of the cage of FIGS. 7 and 8 to effect the grading operation;

Figure 3:
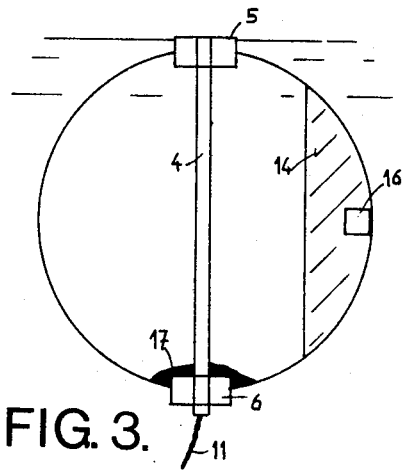
FIGS. 3 to 6 illustrate the manipulations of the cage of FIG. 1 to permit the removal of dead fish.

The cage of FIG. 1 comprises a cage structure 1 of general spherical construction formed by juxtaposed elements each comprising a hemisphere each element being defined by curved profile rods 2 radiating from a float 5 or 6 and connected circumferentially by curved profile rods 3. A central beam 4 extends between the two floats 5 and 6 to which the beam 4 is fixed.

If the cage is compared to a world globe, the rods 2 in the same hemisphere as the float 5 are connected to float 5, while those which are in the same hemisphere as the float 6 are connected to float 6. The rods 3 of one hemisphere are connected to the rods 3 of the elements of the other hemisphere along the equator, but rods 2 are staggered so that rods 2 of one element of one hemisphere are interspaced with the rods 2 of the element of the other adjacent hemisphere. Rods 2 in one hemisphere are of course connected to one another. Rods 2 and 3 are preferably of light aluminium alloy AG4 MC and the bolts serving for the mounting of the elements are preferably of self-locking bolts of aluminium AG. Each hemisphere comprises for example 10 rods 2. The diameter of the hemisphere may for example be 6.50 m.

The sphere is inside covered with a grating fixed to the inner edges of the rods 2 and 3. The grating may be of aluminium AG4 MC to form meshes of 20 mm, the diameter of the grating wires being for example 2.8 mm.

The assembly of the cage may be effected on the site by connecting the two elements, the grating being provided in plates more or less largely assembled with bars made of aluminium AG of 5 mm diameter, the bars passing into shackles carried by the rods 2 and 3.

The central beam 4, a section of which is preferably square, but may be circular, is likewise made of aluminium alloy. The float 5, likewise of aluminium alloy, is preferably of cylindrical shape with a capacity of about 1200 liters. It is filled with foam so as to be insubmersible and to render the assembly of the cage immersible. The float 6, likewise made of aluminium alloy, is also of cylindrical shape with a capacity of about 970 liters. It has an emptying valve 7 and is connected to a tube 8 which is fixed along the beam 4 and passes to the float 5. It terminates on the upper face of this latter in a connection piece 9.

With a diameter of 6.50 m the inside volume of the cage is of the order 150 m$^3$ and its weight in air is about 1,200 kg and in water about 800 kg.

In the working position, the emptying valve 7 is opened and the cage takes up a position where the beam 4 is vertical as indicated in FIG. 1. In this position the float 5 is flush with the surface of the water.

Under the float 6 is fixed an anchoring eye bolt 10 which permits, conventionally, the connecting of the cage to a dead weight by means of a chain 11. In practice, the beam 4 passes through the float 6 and the eye bolt 10 is fixed to its end. The eye bolt 10 is not directly in contact with the structure made of aluminium its swivel being insulated by a joint made of teflon of high corrosion resistance.

When it is desired to work on the cage, for example to collect dead fish or clean the cage a tube 12 is connected to the connection piece 9 and the outlet of an air compressor 13 mounted on the edge of a service boat 14. The compressor 13 drives out the water in the inside of the float 6 which functions as undersea ballast. The cage then takes up the position indicated in FIG. 2 with the beam 4 horizontal between the floats 5 and 6. Once this horizontal position is achieved the operating of the compressor 13 is stopped and the valve 7 closed. The volumes of the floats 5 and 6 have been arranged so that in this horizontal position about half the beam is out of the water which implies that the half of the volume of the cage is out of the water. To bring the cage into the vertical position as indicated in FIG. 1 it suffices to open the valve 7.

Figure 7:
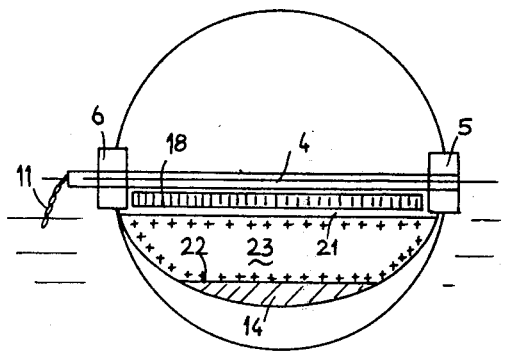
FIGS. 7 and 8 show diagrammatically the means which are mounted in a cage of a second embodiment of the invention to enable a fish sorting operation to take place.
Figure 8:
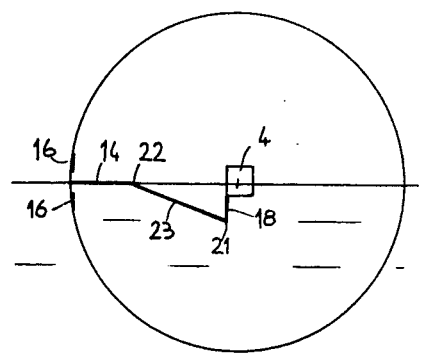

It can be easily understood that once put in horizontal position by proceeding as indicated above it is easy to cause the cage to rotate around the beam 4. As will be described in the following, this possibility is put to advantage to effect the operations of collecting fish, as well as the cleaning of the cage and in addition in the FIGS. 7 and 8 embodiments, the sorting of the fish. However, first of all what is convenient to call the rudder 14 (FIG. 1), mounted inside the cage, will be described.

As FIG. 1 shows the rods (or half-meridians) 2' and the rod portion arc 3' are connected to a supplementary rod 15 mounted as an extension of a rod 2 from the float 6 from the middle of the arc 3' at equal distances from the rods 2' is provided. The rod 15 is therefore between the rods 2' of the upper hemisphere. Along a part of 15 and the rod 2' of which 15 is an extension is fixed a plasticizes cloth 14 constituting a segment of a circle and functioning as a rudder. Furthermore, the rods 2'-3' have attached in the proximity of both sides of the rudder 14 two operable lattice doors 16 to provide access to the cage. Of course, the grating of the cage is connected to the peripheries of the doors 16 but omitted in front of the latter.

When the cage is immersed as shown in FIG. 1, the rudder 14 keeps the orientation of the cage in the current and therefore stabilizes it.

Figure 4:
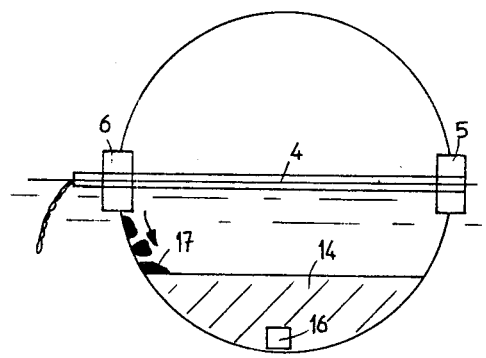
Figure 5:
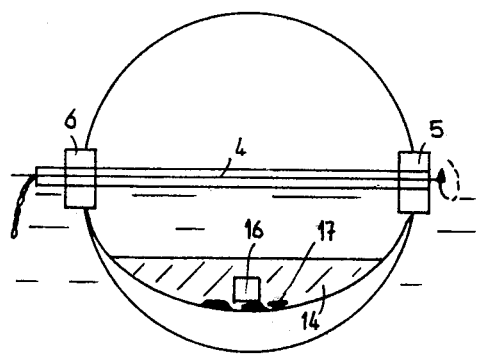
Figure 6:
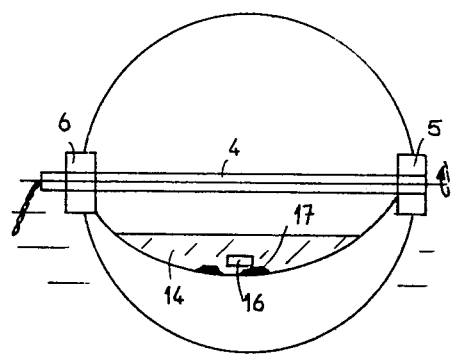

In connection with FIGS. 3 to 6, it will now be described how the dead fish are collected. When the cage is vertical FIG. 3, the dead fish collect at the bottom of the cage above the float 6 as indicated at 17. When the cage is caused to pass to the horizontal position as indicated in FIG. 4, the dead fish 17 slide around the inside of the cage and are distributed on both sides of the rudder 14 which, due to its weight, takes the lowest position of the cage. The cage is then caused to rotate about the beam 4 to bring back the rudder 14 into the direction of the surface of the water. The door 16 above the rudder 14 is then opened and dead fish located on the top of the surface of the rudder 14 are collected. The cage is then subjected to a rotation of 180° in the other direction and the other door 16 is opened to collect the dead fish located on the other face of 14. FIGS. 5 and 6 show the fish collected by rudder 14 in the course of one rotation.

In connection with the embodiments of FIGS. 7 to 12, it will now be described how a cage can be constructed to effect the sorting of the population of fish living, in the cage. One commences by bringing the cage (which is of the same construction as the cage of FIG. 1 with modifications), into the horizontal position with the rudder 14 flush with the surface of the water as just described. There is in this embodiment, a grading plate structure in the form of screen 18. FIG. 9 shows the screen 18 on a larger scale, the screen 18 slides into fixing chips 19 along the beam 4, and clips 20 on the respective inner faces of the floats 5 and 6. The spacing of the bars of the screen 18 determines the size of fish which cannot pass through the screen. Between the edge 21 of the screen 18 and the inner edge of the rudder 14 is an intermediate plate 23 disposed as shown so that the screen 18 and plate 23 define a tank, the plate 23 being also connected to the rods 15 and 2 on both sides of rudder 14, so that the tank is enclosed except as regards the spaces between the bars of screen.

To grade the fish rudder 14 is drawn above the water so that the whole screen 18 is out of the water as indicated in FIG. 10. Then the cage is turned in the direction of the arrow A so that rudder 14, plate 23 and screen 18 which together define a panel sweep together all the volume of water filling the immersed part of the cage. In the course of the rotation the smallest fish pass through the screen 18 but the largest remain caught as shown at 24 as indicated in FIG. 12. When it surfaces, these fish can be collected out of the water through the cage door 16.

It can be noted furthermore from FIGS. 8 and 9 to 12 that the plane of the screen 18 is perpendicular to that of the rudder 14. By this arrangement there exists the possibility of collecting the smallest fish instead of the largest. In effect once the position of FIG. 12 is reached, if the cage is caused to turn rapidly in the direction of the arrow B the screen 18 comes out of the water at the end of a half a turn which prevents the small fish from crossing it. The large fish are free in the water while the small ones are above the plate 23 and the rudder 14 where one can collect them by entering through the door 16 which is out of the water.

As FIG. 9 shows rubber tubes 25 may be threaded onto the bars 26 so as to vary the spacing through which the fish can pass.

It should also be noted that either of the cages described when placed in horizontal position may be easily cleaned by brushing on the surface while they are rotated about beam 4. Cleaning maybe likewise be effected by applying water under pressure onto the cage. In effect, by causing each cage to pivot about said axle means one can reach all the points capable of retaining and blocking seaweed which prevents the removal of organic waste and which prevents interior oxygination of the cage. One can likewise leave the cage to float in the horizontal position for one or two days for exposure to the air and the sun causing the drying and the elimination of algae.

Figure 13:
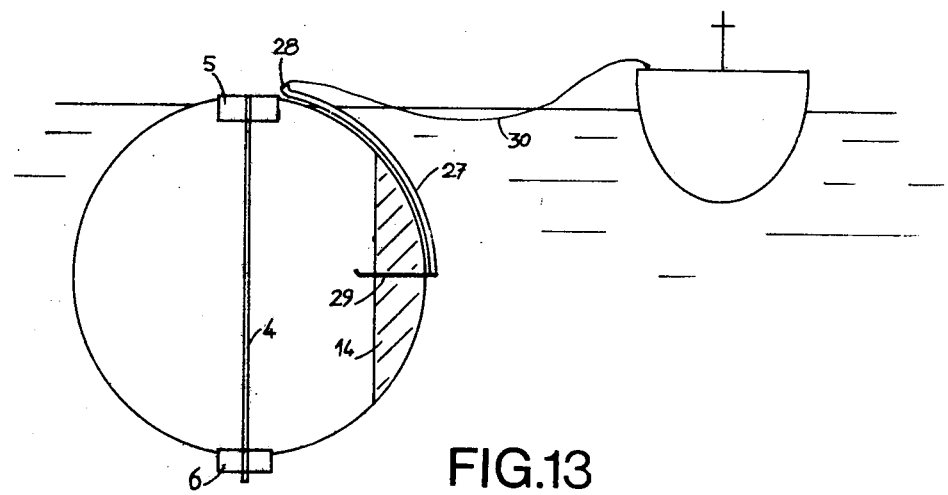
FIG. 13 shows an outlet tube of a system for distribution of food for the cage of FIG. 1 or FIG. 7.

FIG. 13 shiows a food distribution device which can be used with either of the described cages but which may likewise be mounted on other immersed cages. This device comprises a distribution tube 27 extending along the cage between the connection piece 28 and a hollow stem 29 pointing substantially to the center of the cage, the outlet of the hollow stem 29 having deflectors to ensure a good dispersion of the particles of foods.

When the device is mounted on the cage according to the invention when in the immersed position, the hollow stem 29 is mounted horizontally, the cage being assumed vertical, and radially substantially in the meridian plane of the rudder 14. Thus, as the rudder 14 guides the cage according to the direction of the current indicated by the arrow the foods leaving stem 29 are projected against the current and are kept longer in the cage and are distributed therein uniformly.

Figure 14:
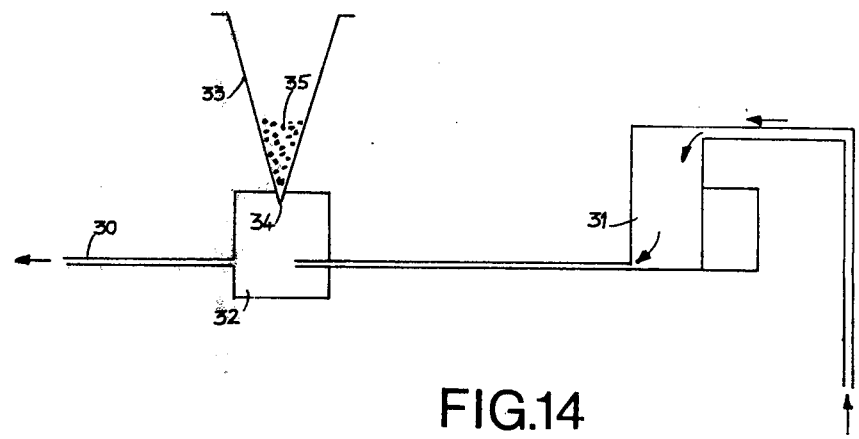
FIG. 14 shows a diagram of the system for distribution of food to the outlet tube shown in FIG. 13.

To effect the distribution of food in the cage there is branched into the connection piece 28, a tube 30 coming from a feeding system shown in FIG. 14 mounted on the edge of the service boat.

The system of FIG. 14 comprises a water pump 32 supplied with sea water which delivers the water under pressure into a receptable 32 into which likewise leads the bottom of a funnel 33 provided with a non-return valve 34. Container 33 has an outlet connected to the tube 30. The operation of the system of FIG. 14 is as follows: The outlet of the water from the container 22 creates therein reduced pressure which draws in the particles of food placed in the funnel 33 and these particles are projected with the water under pressure through the tubes 30, 27 and 29 into the cage as FIG. 13 indicates.

Although in the preceding description a cage of spherical shape has been considered, more particularly it must be understood that the invention is applicable likewise to the case of any cage capable of revolving around a center mounted axle means.

While the principles of the invention have been described above in connection with the specific apparatus and applications, it is to be understood that this description is made by way of example only and not as a limitation on the scope of the claims.

What is claimed is:

1. A totally submersable marine cage for breeding fish, set cage comprising:
    an axle;
    a cage wall structure depending from said axle,
    said cage wall structure including a mesh grating forming an enclosure to prevent fish from escaping;
    at least one float means positioned at each end of said axle;
    means to fill at least one of said float means with liquid whereby said float means acts as a ballasting device;
    said float means including ballasting control means;
    said cage rotatable on said axle; and
    a plate,
    said plate lying in a plane containing said axle and secured within said cage wall structure and extending partially thereinto whereby said plate acts to orient said cage when said axle is vertical.

2. The marine cage of 1 wherein said plate extends to the grating mesh, whereby when said axle is horizontal said plate snares any dead fish in the cage, when the cage revolves about said axle.

3. The marine cage of claim 1 wherein said cage structure has a door located proximate said plate to give access to at least one of the faces of said plate.

4. The marine cage of claim 1 including a connection panel extending between said axle and said grating,
    said connection panel comprising sorting plate means,
    said sorting plate means including a mesh section whereby with the cage structure in a horizontal position turning of the cage separates the fish according to size.

5. The marine cage of claim 4 wherein said connection panel includes an intermediate plate section, and
    said intermediate plate section cooperates with the sorting plate to define a compartment for the fish which cannot pass through said grating.

6. The marine cage claim 5 wherein the plane of said sorting plate is different than the plane of said plate.

7. The marine cage of claim 1 including a radial feed tube fixed on the first plate substantially perpendicular to said axle for enabling the insertion under pressure of particles of food toward the center of the cage.

* * * * *

UNITED STATES PATENT AND TRADEMARK OFFICE
CERTIFICATE OF CORRECTION

PATENT NO. : 4,312,296
DATED : January 26, 1982
INVENTOR(S) : Yan Stelleman
Gerard Jouan It is certified that error appears in the above-identified patent and that said Letters Patent are hereby corrected as shown below:

Col. 4, line 33   After "screen" insert --18--

*Signed and Sealed this*

*Twenty-fifth* Day of *May 1982*

[SEAL]

*Attest:*

*Attesting Officer*

GERALD J. MOSSINGHOFF
*Commissioner of Patents and Trademarks*